United States Patent
Taylor

(10) Patent No.: US 7,591,946 B2
(45) Date of Patent: Sep. 22, 2009

(54) DUAL ZONE FEEDWELL FOR A THICKENER

(75) Inventor: David John Buchanan Taylor, New South Wales (AU)

(73) Assignee: Outotec Oyj, Espoo (FI)

( * ) Notice: Subject to any disclaimer, the term of this patent is extended or adjusted under 35 U.S.C. 154(b) by 200 days.

(21) Appl. No.: 10/507,715

(22) PCT Filed: Mar. 11, 2003

(86) PCT No.: PCT/AU03/00285

§ 371 (c)(1),
(2), (4) Date: Sep. 14, 2004

(87) PCT Pub. No.: WO03/078021

PCT Pub. Date: Sep. 25, 2003

(65) Prior Publication Data

US 2005/0115907 A1    Jun. 2, 2005

(30) Foreign Application Priority Data

Mar. 19, 2002    (AU) .................................... PS1188

(51) Int. Cl.
*B01D 21/24* (2006.01)
(52) U.S. Cl. ........................ 210/208; 210/199; 210/519; 210/528
(58) Field of Classification Search .................. 210/208
See application file for complete search history.

(56) References Cited

U.S. PATENT DOCUMENTS

| | | | |
|---|---|---|---|
| 2,960,226 A * | 11/1960 | Ekstrom, Jr. ................. | 209/158 |
| 3,036,713 A * | 6/1962 | Lambeth ..................... | 210/197 |
| 3,926,805 A * | 12/1975 | Walker ....................... | 210/101 |
| 4,054,514 A * | 10/1977 | Oltmann ..................... | 210/715 |
| 4,055,494 A * | 10/1977 | Emmett, Jr. .................. | 210/715 |
| 4,293,416 A * | 10/1981 | Keoteklian .................. | 210/208 |
| 4,303,517 A * | 12/1981 | Love et al. ................... | 210/208 |
| 4,390,429 A * | 6/1983 | Lejeune et al. ............... | 210/519 |
| 5,015,392 A | 5/1991 | Taylor ........................ | 210/712 |
| 5,147,556 A | 9/1992 | Taylor ........................ | 210/712 |
| 6,276,537 B1 * | 8/2001 | Esler et al. ................... | 210/519 |

(Continued)

FOREIGN PATENT DOCUMENTS

JP    0274241979    9/1980

(Continued)

OTHER PUBLICATIONS

Derwent Abstract No. 97-296689/27, Class D 15 J 01, SU 1506823 A1; IRKUT Heavy Mech Eng Wks; Nov. 10, 1996.

(Continued)

*Primary Examiner*—Peter A. Hruskoci
(74) *Attorney, Agent, or Firm*—Darby & Darby P.C.

(57) ABSTRACT

The invention provides an extraction device (1) for liquid suspensions and pulps and is designed for use in the field of mineral processing. The extraction device includes two adjacent upstream and downstream concentric chambers (2) and (3) defining a feedwell (4). The feedwell is centrally located upstream of a third chamber in the form of a thickening tank (5). All three chambers are in sequential unidirectional fluid flow relationship such that feed liquid flows firstly from chamber (2) to chamber (3) and then to the tank (5).

18 Claims, 3 Drawing Sheets

U.S. PATENT DOCUMENTS 6,800,209 B2 * 10/2004 Wright .................. 210/801
6,855,262 B2 * 2/2005 Nyman et al. ............ 210/800
6,966,985 B2 * 11/2005 Schoenbrunn et al. ... 210/195.1

FOREIGN PATENT DOCUMENTS

JP   2756061995   10/1995
WO   WO 01/19489   3/2001

OTHER PUBLICATIONS

Lightnin brochure LA-102, *Thickening and Clarification Dynamics*, published no later than Nov. 2001 at http://www.lightninmixes.com.

* cited by examiner

DUAL ZONE FEEDWELL FOR A THICKENER

FIELD OF THE INVENTION

The present invention relates to separation devices for liquid suspensions and pulps and in particular to a feedwell for use in such devices. It has been developed primarily for use in thickeners and will be described hereinafter with reference to this application. However, it will be appreciated that the invention is not limited to this particular field of use.

BACKGROUND OF THE INVENTION

The following discussion of the prior art is intended to present the invention in an appropriate technical context and allow its significance to be properly appreciated. Unless clearly indicated to the contrary, however, reference to any prior art in this specification should not be construed as an admission that such art is widely known or forms part of common general knowledge in the field.

Known separation devices of this type typically include a thickening tank and a feedwell disposed generally within the tank to contain feed slurry. The feedwell is comprised of a single chamber having an inlet for receiving feed slurry and at least one restricted outlet for directing the slurry into the thickening tank. The feedwell is configured to reduce the turbulence of the incoming feed stream, to allow reagents to be mixed into the slurry, and to allow for reaction between reagents and the feed material before the treated slurry is discharged into the thickening tank. The configuration of the feedwell also promotes even distribution of slurry flowing from its outlet into the thickening tank.

Known extraction devices do not optimise the mixing and distribution of liquid entering the thickening tank from the feedwell outlet. They suffer from back-mixing of liquid from the thickening tank into the feedwell as well as short-circuiting of liquid flow from the feedwell itself. Another shortcoming, in some circumstances, is that insufficient residence time is provided to allow for optimum reaction of flocculants and reagents. Similarly, the residence time is often insufficient to allow for staged addition of reagents, requiring additional upstream tanks to be added, in turn increasing cost and space requirements.

It is an object of the invention to overcome or ameliorate one or, more of the deficiencies of the prior art, or at least to provide a useful alternative.

DISCLOSURE OF THE INVENTION

According to a first aspect of the invention, there is provided a feedwell for a separation device, said feedwell including at least two adjacent upstream and downstream substantially concentric chambers, said chambers being in sequential unidirectional fluid flow relationship such that fluid entering said feedwell flows sequentially from said upstream chamber into said downstream chamber for subsequent discharge into the separation device.

Preferably, the inlet to the downstream chamber is located centrally above the floor of the upstream chamber.

In a particularly preferred form, the upstream chamber is cylindrical and the downstream chamber is concentrically frusto-conical with the sidewalls of the downstream chamber diverging downwardly and outwardly from its inlet.

Preferably also, the feedwell includes a concentrically nested deflection cone forming the floor of the downstream chamber and defining an annular outlet from the is downstream chamber. More preferably, the annular outlet has an area substantially less than the mean cross-sectional area of the downstream chamber partially to restrict the flow of liquid from the feedwell.

Preferably, the upstream chamber includes at least one agitator for mixing flocculant into the liquid suspension. Preferably, the separation device is a thickener.

According to a second aspect of the invention, there is provided a separation device for a liquid suspension including a feedwell as defined above having at least two adjacent upstream and downstream substantially concentric chambers, said feedwell being centrally located upstream of a third chamber defining a thickening tank, said three chambers being in sequential unidirectional fluid flow relationship.

In a preferred form, the third chamber includes a circumferential overflow launder for decanting excess overflow liquor from the thickening tank to a discharge pipe.

Preferably, a rake assembly is centrally rotatably mounted within the thickening tank. Preferably, the rake assembly includes a plurality of radially extending rake arms each fixedly connected at one end to a central hub. More preferably, a plurality of rake blades is fixedly connected to each arm with each blade extending axially into the tank such that as the rake rotates, the blades sweep through the fluid in the tank.

According to a third aspect, the invention provides a method for separating liquid suspensions or pulps in a thickener, said method including the steps of:

providing a thickening tank adapted to facilitate settling;

providing a feedwell having an upstream chamber and a downstream chamber, disposed such that fluid entering said feedwell flows sequentially from said upstream chamber into said downstream chamber and then into said thickening tank;

directing a liquid suspension or pulp into said upstream chamber;

allowing said liquid suspension or pulp to flow from said upstream chamber into said downstream chamber; and allowing said liquid suspension or pulp to flow from said downstream chamber into said thickening tank to facilitate separation.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
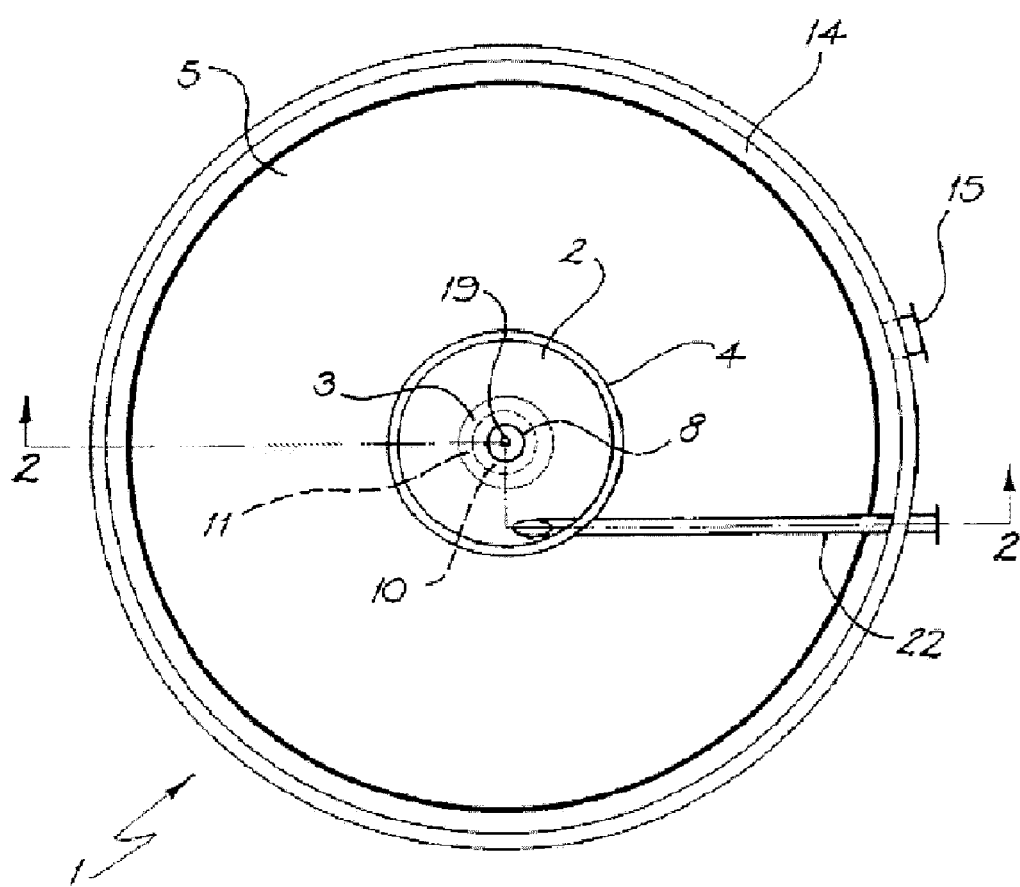
FIG. 1 is a plan view of a thickener for a liquid suspension according to the invention.
Figure 2:
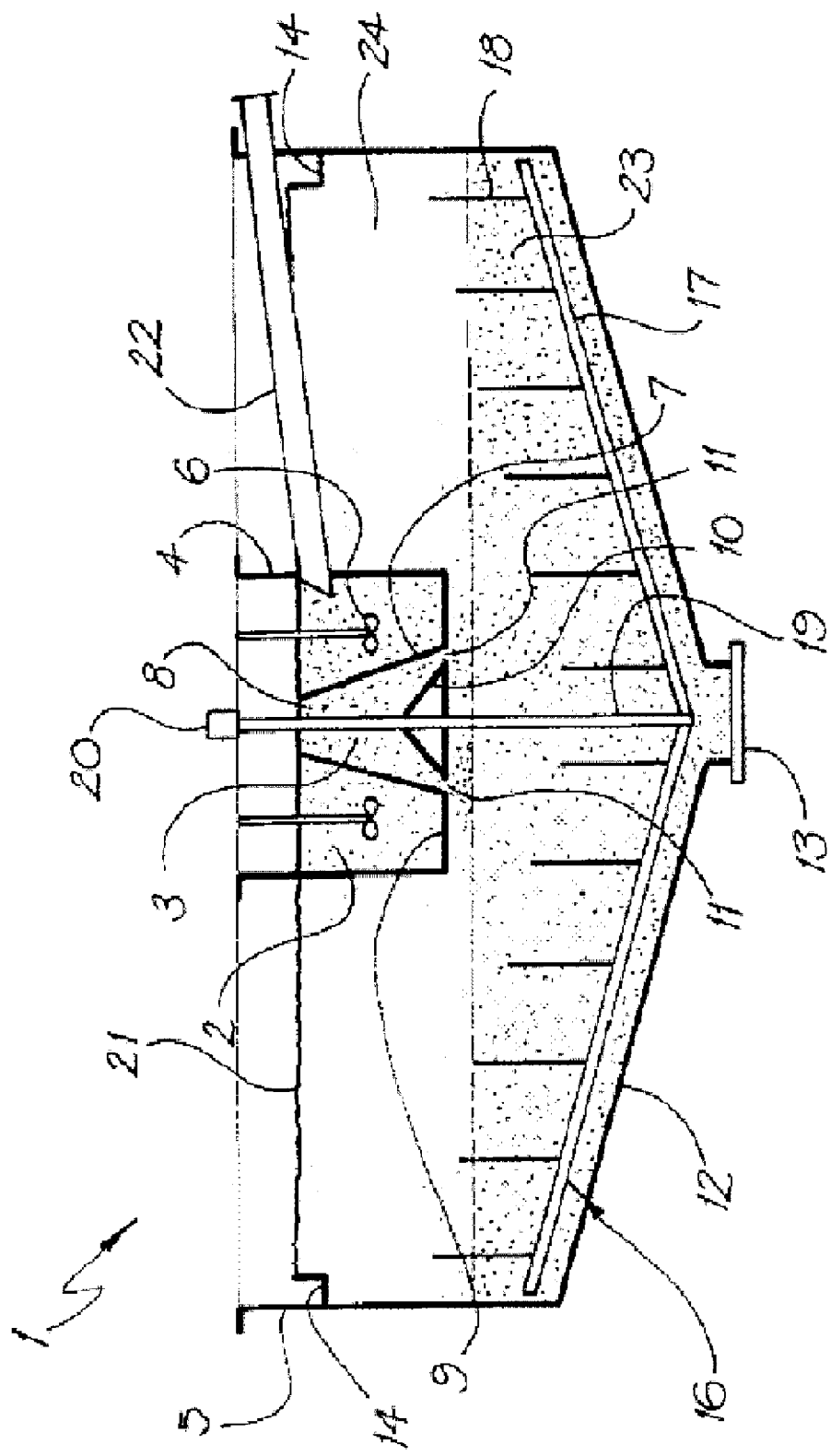
FIG. 2, is an offset sectional view of the thickener, taken on line 2-2 of FIG. 1.
Figure 3:
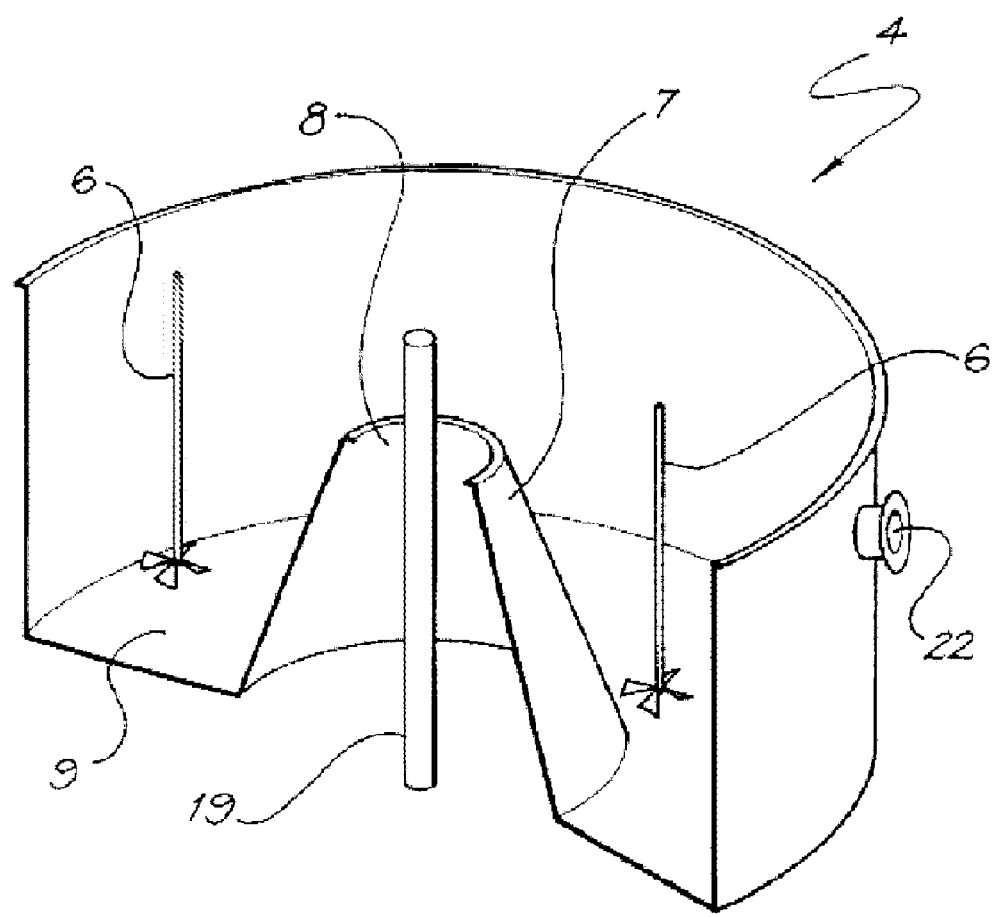
FIG. 3 is a pictorial perspective view of a feedwell according to the invention.

A preferred application of the invention is in the fields of mineral processing, separation and extraction, whereby finely ground ore is suspended as pulp in a suitable liquid medium such as water at a consistency which permits flow, and settlement in quiescent conditions. The pulp is precipitated from the suspension by a combination of chemical and mechanical processes. Initially, coagulant is added and mixed into the suspension in a first chamber, followed by the addition of flocculant in a second chamber. The suspension is then carefully mixed to facilitate the clumping together of solid particles, eventually forming larger denser particles that are precipitated out of suspension.

Referring to the drawings, the extraction device 1 includes two adjacent upstream and downstream concentric chambers 2 and 3 defining a feedwell 4. The feedwell is centrally located upstream of a third chamber in the form of a thickening tank 5. All three chambers are in sequential unidirectional fluid flow relationship such that feed liquid flows firstly from chamber 2 to chamber 3 and then to the tank 5.

In this embodiment, the first chamber 2 is right-cylindrical in shape and includes two agitators 6 for mixing reagents into the liquid suspension and for preventing solids from settling onto the floor of the chamber. Chamber 3 is located centrally within chamber 2 and is frusto-conical in shape, with its sidewall 7 diverging downwardly and outwardly from inlet 8. The inlet is located centrally above the floor 9 of chamber 2.

A deflection cone 10 is located internally of chamber 3 and forms its floor. The space between the chamber sidewall 7 and the deflection cone 10 defines a restricted annular outlet 11 from chamber 3 into the tank 5. This outlet 11 has an area substantially less than the mean cross-sectional area of chamber 3 to restrict the flow of liquid between feedwell 4 and tank 5, thereby promoting smooth, non-turbulent flow and homogenous distribution of liquid within the tank.

The tank 5 is substantially right-cylindrical and in this embodiment is formed of reinforced concrete. The tank includes a downwardly sloping flusto-conical floor 12 for directing precipitated pulp towards an underflow withdrawal pipe. 13. The tank also includes an inwardly directed circumferential overflow launder 14 for decanting dilute overflow liquor from the thickening tank into a discharge pipe 15.

A rake 16 is centrally rotatably mounted within the tank 5. The rake includes a plurality of radially extending rake arms 17, each supporting a plurality of fixedly connected rake blades 18. The blades extend axially into the tank such that as the rake 16 rotates, the blades sweep through the fluid in the tank. This sweeping assists in the release of water from the slurry in the bed, thereby increasing its density. The rake is mounted on a centrally located drive-shaft 19 driven by a motor 20 and an associated gearbox (not shown).

In use, the fluid level 21 of tank 5 is located above the level of outlet 11 from chamber 3. The feed liquid enters chamber 2 through an inlet 22 and reagents are added according to a predetermined dosage rate. The volume of slurry in chamber 2 gradually increases, thereby providing sufficient residence time for reaction of the reagents until they overflow into the inner chamber 3. The slurry entering chamber 3 may be dosed with a different reagent to that used in chamber 2, or it may be dosed with more of the same reagent, thus allowing for staged addition. It then flows downwardly under gravity towards the deflection cone 10, which gradually disperses the liquid radially outwardly through the outlet 11 into the surrounding tank.

In the tank, the precipitate in the incoming feed stream settles to form a relatively dense bed of thickened pulp 23 that displaces an upper layer of relatively dilute liquid 24 towards the top of the tank. The thickened pulp 23 is drawn off from below through the underflow withdrawal pipe 13, while the dilute liquor is progressively drawn off through the overflow launder.

In another feedwell embodiment (not shown), the first chamber is frusto-conical, with its sidewalls diverging radially inwardly from its floor to an outlet at its peak. This first chamber is located centrally within a second right-cylindrical chamber and fluid leaves this second chamber through an annular outlet defined by the space between the respective chamber walls.

It will be appreciated that the illustrated device provides improved mixing and distribution of fluid entering the thickening tank from the feedwell outlet. The device also reduces the incidence of back-mixing of fluid from the thickening tank into the feedwell, allows for staged addition of reagents, as well as reducing short-circuiting of fluid flow from the feedwell itself. The concentric configuration of the device also reduces the space that it occupies within the tank. In all these respects, the invention represents a practical and commercially significant improvement over the prior art.

Although the invention has been described with reference to specific examples, it will be appreciated by those skilled in the art that the invention may be embodied in many other forms.

The claimes defining the invention are as follows:

1. A feedwell for a separation device, said feedwell comprising:
    at least two adjacent upstream and downstream substantially concentric chambers, said chambers being in sequential unidirectional fluid flow relationship, such that fluid entering said feedwell overflows from said upstream chamber into said downstream chamber for subsequent discharge from an outlet thereof into the separation device, the downstream chamber comprising sidewalls diverging toward the outlet.

2. A feedwell according to claim 1, wherein an inlet to the downstream chamber is located generally centrally above a floor of the upstream chamber.

3. A feedwell according to claim 1, wherein the upstream chamber is generally cylindrical.

4. A feedwell according to claim 1, wherein the downstream chamber is generally concentrically frusto-conical with sidewalls of the downstream chamber diverging downwardly and outwardly from an inlet thereto.

5. A feedwell according to claim 1, wherein the upstream chamber includes at least one agitator for mixing flocculant into a liquid suspension or pulp.

6. A feedwell according to claim 1, wherein the separation device is a thickener.

7. A separation device for liquid suspensions or pulps, said device comprising a feedwell as defined in claim 1, and being centrally located upstream of a third chamber defining a thickening tank, the three chambers being in sequential unidirectional fluid flow relationship.

8. A separation device according to claim 7, wherein the third chamber includes a circumferential overflow launder for decanting excess overflow liquor from the thickening tank to a discharge pipe.

9. A separation device according to claim 7, comprising a rake assembly rotatably mounted within the thickening tank.

10. A separation device according to claim 9, wherein the rake assembly includes a plurality of radially extending rake arms each fixedly connected at one end to a central hub.

11. A separation device according to claim 10, wherein a plurality of rake blades is fixedly connected to each arm.

12. A separation device according to claim 11, wherein each rake blade extends axially into the tank such that upon rotation of the rake, the blades sweep through the fluid in the tank.

13. A feedwell according to claim 1, wherein said sequential unidirectional fluid flow relationship between said upstream and downstream chambers is gravity-driven.

14. A feedwell according to claim 1, further comprising a downwardly divergent deflection cone at least partially defining a restricted outlet for restricting the flow of liquid from the downstream chamber.

15. A feedwell according to claim 14, wherein the downwardly divergent deflection cone is part of a concentrically nested deflection cone forming a floor of the downstream chamber and defining an annular outlet from the downstream chamber.

16. A feedwell according to claim 15, wherein the annular outlet has an area substantially less than a mean cross-sectional area of the downstream chamber, thereby partially to restrict the flow of liquid from the feedwell.

17. A feedwell according to claim 14, wherein said upstream and downstream chambers have a common sidewall partially defining the restricted outlet of the downstream chamber.

18. A feedwell according to claim 17, wherein said common sidewall is substantially frusto-conical.

* * * * *